Feb. 25, 1969 P. L. LEONARD 3,430,073

WAVEFORM GENERATOR

Filed March 2, 1967

INVENTOR.
Paul L. Leonard
BY Thomas N. Young
ATTORNEY

3,430,073
WAVEFORM GENERATOR

Paul L. Leonard, Muskego, Wis., assignor to General Motors Corporation, Detroit, Mich., a corporation of Delaware

Filed Mar. 2, 1967, Ser. No. 620,062
U.S. Cl. 307—260 6 Claims
Int. Cl. H03k *3/57*

ABSTRACT OF THE DISCLOSURE

Apparatus for generating a waveform having a sequence of distinct voltage levels including a transformer having a center-tapped primary, a source connected to the center tap and a plurality of transistor switches connected to increasingly larger numbers of primary turns on either side of the center tap. By connecting the outputs of a ring counter to close the transistor switches in a particular order, the desired sequence of voltage level changes in the secondary is produced. Additional phases of the waveform may be generated by connecting the counter to additional transformer and switch units in an order comparable to the first but delayed in time.

This invention relates to waveform generators of the type employing a sequence of distinct voltage levels to approximate a desired waveform across the secondary winding of a transformer.

More particularly, the invention contemplates programmable waveform generator including a transformer having secondary winding adapted for connection to a load and a multiturn primary winding. In accordance with the invention a source of direct voltage is connected to a fixed point on the primary winding to supply electrical energy to that point. Individual circuits from the source through increasingly greater numbers of primary turns are formed by switches connected to spaced points along the primary. The switches may conveniently be transistors. A timing device such as a ring counter having a plurality of output signal channels which are energizable in sequence is interconnected with the transistor switches such that as the timing means progresses through a normal sequence the transistor switches are rendered conductive one at a time in such an order as to produce a sequence of voltage level changes which approximate the desired waveform across the transformer secondary winding.

In a preferred form of the invention the source of direct voltage is connected to a center tap on the transformer primary winding and the transistor switches are symmetrically distributed along either side of the center tap such that secondary voltage changes of either positive or negative polarity may be generated.

In a still further form of the invention a single timing device may be employed to drive two or more combinations of transformers nad transistor switches in a similar but phase shifted manner thereby to generate a polyphase waveform of desired shape.

The invention may be best understood by reference to the following specification which describes specific embodiments of the invention together with the accompanying drawings of which:

Figures 1, 2:
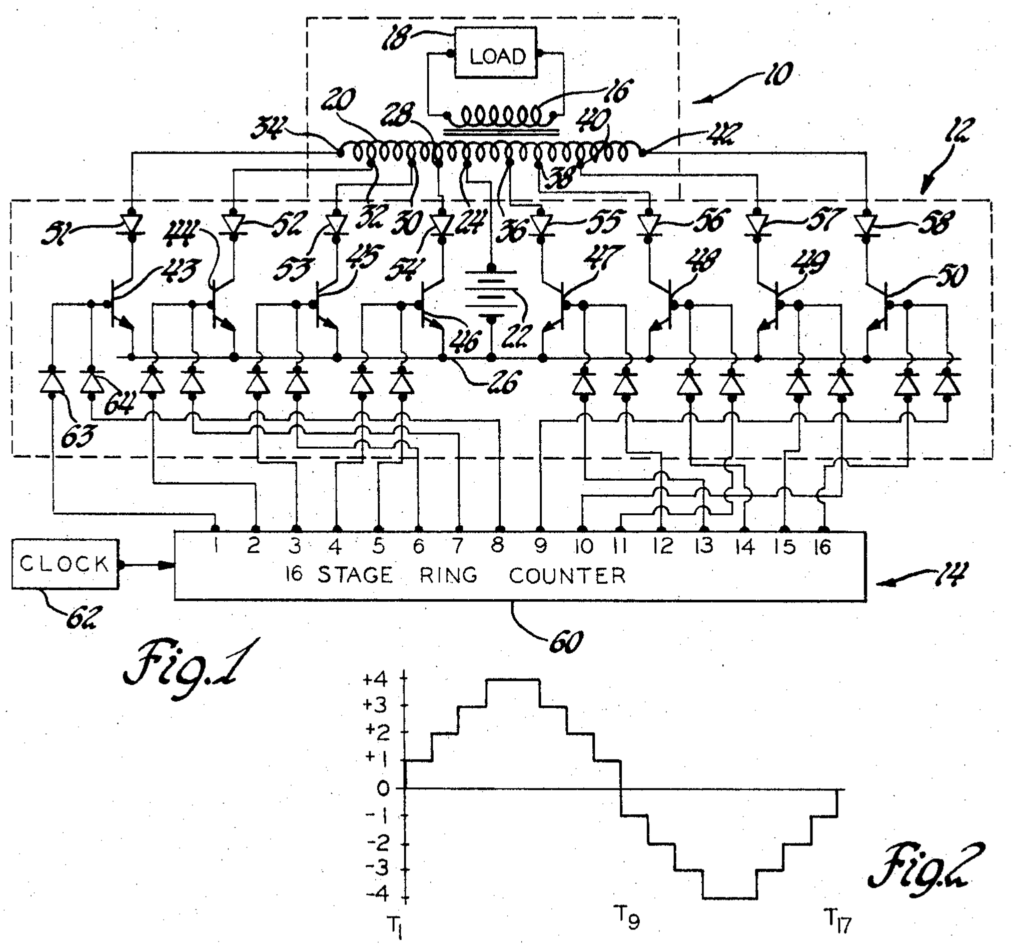
FIGURE 1 is a schematic diagram of a specific embodiment of the invention designed to produce a sinusoidal output waveform.
FIGURE 2 is a diagrammatic representation of the output of the FIGURE 1 device.

Referring to FIGURE 1 the specific embodiment of the invention includes an output unit 10, a transistor switch unit 12, and a timing unit 14. In general, the combination of units 10, 12 and 14 are arranged so that the timing unit 14 controls the operation of the individual transistors in the switch unit 12 to generate an arbitrarily selected waveform in the output unit 10 which waveform comprises a sequence of distinct voltage levels thus to resemble a stair step waveform as indicated in FIGURE 2.

Output unit 10 comprises a transformer having a secondary winding 16 which is adapted for connection across a load device 18 which may, for example, be the stator of hysteresis motor of the type used to drive the rotor of a gyroscope. The transformer further comprises a multiturn primary winding 20. A direct voltage source 22 in the form of a large and, hence, relatively constant voltage battery has the positive terminal thereof connected to a center tap 24 which effectively divides the primary winding 20 into right and left-hand portions as seen in the drawings. The negative terminal of source 22 is connected to a return bus 26.

The left-hand portion of winding 20 is provided with uniformly spaced taps 28, 30, 32 and 34 which are connected to the primary winding at locations representing uniformly increasing numbers of turns measured from the center tap 24. The right-hand portion of primary winding 20 is similarly provided with taps 36, 38, 40 and 42 which are disposed along the winding 20 at points representing uniformly increasing numbers of turns measured away from the center tap 24. Beginning at the left-hand side of winding 20 taps 34, 32, 30, 28, 36, 38, 40 and 42 are connected to switching transistors 43 through 50, respectively, by way of diodes 51 through 58, respectively. The output or collector-emitter circuit of each of the transistors 43 through 50 is connected to the return bus 26 to complete an electrical circuit back to the negative terminal of source 22.

In the specific embodiment shown in FIGURE 1, NPN transistors are used. Therefore, the output circuit comprises the collector to emitter circuit. However, it is to be understood that the invention is not limited to any particular type of transistor or specific transistor connection.

For purposes of discussion, it will be assumed that the voltage level induced in secondary winding 16 by the conduction of any of the transistors 43 through 46 shall be positive in polarity and the voltage level induced by conduction of any of transistors 47 through 50 shall be negative in polarity.

Timing unit 14 comprises a 16 stage ring counter having 16 appropriately numbered output channels and a clock 62 which drives the counter to produce a sequence of output voltages on the various channels. Since the clock 62 may be made very stable in frequency the occurrence of the outputs in the 16 stages of counter 60 is also highly stabilized in frequency. The output signal sequence is a recurring one, progressing from 1 to 16 during as many of each succeeding timing periods as one wishes to generate. A group of 16 diodes such as 63 and 64 is connected between the respective output channels of counter 60 and the input or base electrode of each of the transistors 43 through 50. The signal appearing on the output channels of counter 60 is effective to forward bias the transistors 43 through 50 thereby turning the transistors on individually and one at a time in any desired order thereby to cause a desired sequence of voltage amplitude levels to appear across the secondary winding 16 in some desired order. Although any arbitrary order may be selected, the specific embodiment of FIGURE 1 is connected to produce an approximate sinusoid having positive and negative portions as shown in FIGURE 2.

To accomplish this sinusoidal waveform generation the first four output channels of counter 60 are connected individually to the input of transistors 43 through 46 respectively. The next four output channels, that is, 5 through 8, are also connected to transistors 43 through 46 but in the reverse order from the first four output channels. Channels 9 through 12 are connected to transistors 50, 49, 48 and 47 respectively while channels 13 through 16 are similarly connected but in the reverse order. Though the present example shows 8 transistors, four of the transistors being connected on either side of the center tap 24 and 16 output channels, the invention is, of course, not limited to these numbers. If a single polarity output is desired, N transistors may be connected to the primary 20 on one side of the source input tap 24. In the case of center tapped transformer the generalized numerical case is to require 2 N transistors and 4 N counting channels. To produce a balanced waveform, N transistors must, of course, be connected on each side of the center tap, where N is any integer.

In operation, clock 62 is energized to start the 16 stage ring counter 60 into operation. As the counter channels 1 through 8 become individually energized in order, the transistors in the switch unit 12 will fire in the following order: 43, 44, 45, 46, 46, 45, 44, 43. This action generates the positive portion of the sinusoidal waveform shown in FIGURE 2. As the counter channels 9 through 16 are energized, the transistors in the switch unit 12 fire in the following order: 50, 49, 48, 47, 47, 48, 49, 50 thus generating the negative portion of the sinusoidal waveform. Since the same number of transistors is connected on each side of the center tap 24 and the frequency of the clock source 62 is constant the waveform is perfectly symmetrical and perfectly balanced.

Figure 3:
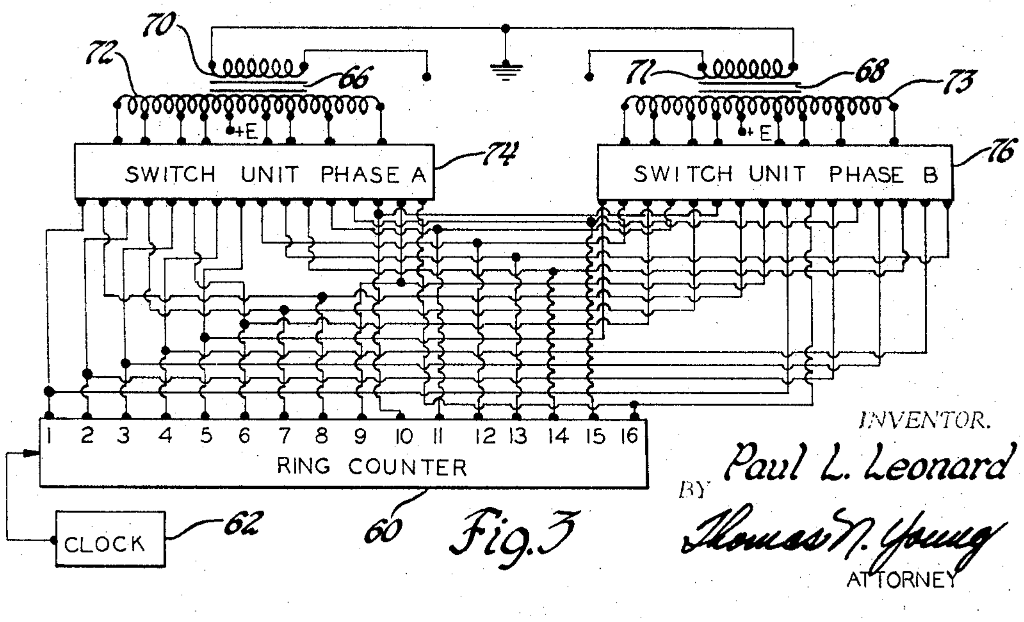
FIGURE 3 is a schematic diagram of a two phase waveform generator constructed in accordance with the invention.

It may be desirable to generate a polyphase waveform such as a two phase sinusoid. Such a waveform may be used advantageously to energize the stator winding of a two phase motor. The circuit of FIGURE 1 is readily expanded to accommodate this requirement as shown in FIGURE 3. This circuit includes a pair of transformers 66 and 68 having secondary windings 70 and 71, respectively, and center tapped primary windings 72 and 73, respectively. The secondary windings 70 and 71 are adapted for connection to a two phase load. The center tap of each of the primary windings 72 and 73 is connected to the positive terminal of a direct voltage source indicated as +E. Each of the primary windings 72 and 73 is provided with additional taps exactly as described with respect to FIGURE 1. The taps along primary winding 72 run to individual transistors in a phase A switch unit 74. The taps along primary winding 73 similarly run to a phase B switch unit 76. Each of the switch units 74 and 76 is identical with switch unit 12 shown in FIGURE 1. In addition, a timing unit comprising a ring counter 60 and a clock 62 is interconnected with the transistors in switch unit 74 in a fashion identical to that shown in FIGURE 1. The output channels of ring counter 60 are also interconnected with the transistors of switch unit 76. However, whereas output channel number 1 is connected to the left-hand most transistor in switch unit 74, output channel number 5 is connected to the left-hand most transistor in switch unit 76. Using output channel number 1 as a starting point for switch unit 74 and output channel number 5 as a starting point for switch unit 76 the sequence of connections to both units 74 and 76 are progressive and thus similar but shifted in time by four clock periods. It will be apparent to those skilled in the art that the 4 channel deviation in the interconnections of units 74 and 76 corresponds to 90 electrical degrees in the output signal waveform which is generated across the secondary windings 70 and 71. Accordingly, sinusoidal waveforms such as that shown in FIGURE 2 occur across both secondary windings 70 and 71. However, the waveform appearing across winding 71 is shifted in phase by 90 electrical degrees from that waveform appearing across secondary winding 70.

Any phase shift greater or less than 90° may be readily accomplished by changing the output channel sequence deviation to a number greater or less than 4.

The use of a single timing device to control the occurrence of voltage levels in both phases A and B causes the phases to be phase-locked and hence immune from relative drift.

Various uses and modifications of the invention will occur to those skilled in the art. For a definition of the invention reference should be taken to the following claims.

I claim:

1. Apparatus for generating a waveform having a desired amplitude-time relationship comprising a transformer having a multiturn primary winding portion adapted to receive input excitation and a secondary winding adapted for connection to a load, a source of direct voltage having one terminal connected to one side of the primary portion, a plurality of switching transistors having output circuits connected between the other terminal of the source and spaced points along said primary portion representing increasing numbers of turns measured from said one side, and counter means having a plurality of outputs which are energized in sequence, the outputs being individually connected to the transistors to turn the transistors on in an order causing said waveform to appear across the secondary winding.

2. Apparatus as defined in claim 1 including a second primary winding portion connected to the first portion to form a continuous winding having a center tap, the one terminal being connected to the center tap, and a second plurality of switching transistors having output circuits connected between the other terminal and spaced points along said second portion representing increasing numbers of turns measured from the center tap, at least some of the outputs of the counter means being connected to the second plurality of transistors to turn the transistors on in a desired order to produce a secondary waveform of polarity opposite to that caused by said first plurality of transistors.

3. Apparatus for generating a waveform having a desired number and order of amplitude levels comprising a transformer having a center-tapped primary winding adapted to receive excitation signals and a secondary winding adapted for connection to a load, a source of direct voltage connected on the positive side to the center tap of the primary winding, a switching unit comprising a plurality of transistors having output circuits connected between the negative side of the source and uniformly spaced points along the primary winding representing increasing numbers of turns on both sides of the center tap, a timing unit comprising a plurality of signal channels for producing a sequence of switching signals equal in number to the desired number of amplitude level changes and occurring at a desired rate, and means connecting the switching signals to the transistors to turn the transistors on in such order as to cause the amplitude levels to appear across the secondary winding.

4. The apparatus described in claim 3 wherein the switching unit compirses 2 N transistors, N transistors being connected to the primary winding on each side of the center tap, where N is an integer, the timing unit comprises at least 4 N signal channels whereby said channels may be connected to the transistors to produce a symmetrical waveform of reversing polarity.

5. The apparatus described in claim 4 wherein the first N signal channels are connected to N transistors on one side of the center tap, in order from the largest to the smallest number of turns, the second N channels are connected in reverse order to the first N channels, the third N channels are connected to N transistors on the other side of the center tap in order from the largest to the smallest number of turns, and the fourth N channels are connected in reverse order to the third N channels whereby the waveform approximates a balanced sinusoid.

6. Apparatus for generating a polyphase signal having at least two similar waveforms shifted in phase by a desired amount, the apparatus comprising first and second transformers each having a secondary winding and a center tapped primary winding, a source of direct voltage connected to the center tap of each of the primary windings, first and second switch units associated with the first and second transformers, respectively, each of the switch units including 2 N switching transistors, the output circuits of N transistors being connected between uniformly spaced points along each side of a primary winding and the source to define primary circuits of increasing numbers of primary winding turns, N being an integer, a timing unit comprising a counter having a plurality of output signal channels, a clock to energize each of the channels in a recurring sequence, means connecting said output channels to the transistors of the first switch unit in a first order to cause individual transistors to be turned on at times related to desired amplitude level changes in the first waveform of said polyphase signal, and means connecting said channels to the transistors of the second switch unit in a second order similar to the first order but delayed in time by a number of output signal channels corresponding to the desired phase shift between the first and second waveforms.

References Cited

UNITED STATES PATENTS

| | | | |
|---|---|---|---|
| 3,002,142 | 9/1961 | Jensen | 328—186 X |
| 3,078,378 | 2/1963 | Burley et al. | 307—223 X |
| 3,118,072 | 1/1964 | Filippazzi | 328—104 X |
| 3,175,160 | 3/1965 | Pintell | 307—252 X |

JOHN S. HEYMAN, *Primary Examiner.*

U.S. Cl. X.R.

307—223, 262